United States Patent
Chamarthi et al.

(10) Patent No.: US 9,534,553 B2
(45) Date of Patent: Jan. 3, 2017

(54) METHOD AND SYSTEM FOR ENGINE UNBURNED HYDROCARBON CONTROL

(71) Applicant: Ford Global Technologies, LLC, Dearborn, MI (US)

(72) Inventors: Gopal Krishna Chamarthi, Saline, MI (US); John G. Fraser, Tecumseh (CA); Arnold Kromberg, Howell, MI (US); Anil Shah, Canton, MI (US); Thomas C. Erickson, Ypsilanti, MI (US); Brien Lloyd Fulton, West Bloomfield, MI (US); Scott Eeley, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 14/711,201

(22) Filed: May 13, 2015

(65) Prior Publication Data

US 2015/0240734 A1    Aug. 27, 2015

Related U.S. Application Data

(62) Division of application No. 13/569,041, filed on Aug. 7, 2012, now Pat. No. 9,074,543.

(51) Int. Cl.

| F02D 41/04 | (2006.01) |
|---|---|
| F02D 41/10 | (2006.01) |
| F02D 41/14 | (2006.01) |
| F02D 41/18 | (2006.01) |
| F02D 41/22 | (2006.01) |
| F02D 31/00 | (2006.01) |
| F02D 41/26 | (2006.01) |

(52) U.S. Cl.
CPC ........... *F02D 41/045* (2013.01); *F02D 31/009* (2013.01); *F02D 41/047* (2013.01); *F02D 41/107* (2013.01); *F02D 41/1498* (2013.01); *F02D 41/18* (2013.01); *F02D 41/22* (2013.01); *F02D 41/26* (2013.01); *F02D 2041/227* (2013.01); *F02D 2041/228* (2013.01); *F02D 2200/1012* (2013.01); *F02D 2250/26* (2013.01); *Y02T 10/40* (2013.01)

(58) Field of Classification Search
CPC ...... F02D 41/045; F02D 41/047; F02D 41/18; F02D 41/22; F02D 41/26; F02D 41/107; F02D 41/402; F02D 2200/2012; F02D 2250/26; F02D 2041/227; F02D 2041/228; Y02T 10/40
USPC ......... 701/102–105, 108–110, 114; 123/195, 123/199, 300, 305, 673, 674
See application file for complete search history.

(56) References Cited

U.S. PATENT DOCUMENTS

| 4,492,211 A | 1/1985 | Shimomura et al. |
|---|---|---|
| 5,337,707 A | 8/1994 | Blundell et al. |
| 5,775,298 A | 7/1998 | Haller |
| 6,948,476 B2 | 9/2005 | Gioannini et al. |

(Continued)

*Primary Examiner* — John Kwon
*Assistant Examiner* — Johnny H Hoang
(74) *Attorney, Agent, or Firm* — Julia Voutyras; Alleman Hall McCoy Russell & Tuttle LLP (57) ABSTRACT

Methods and systems are provided for detecting hydrocarbon ingestion into an engine based on the simultaneous monitoring of cylinder imbalance and an elevated exhaust exotherm. Crankshaft acceleration data is monitored during steady-state and transient engine conditions while exhaust temperatures are estimated during non-regeneration conditions. Engine speed and load is limited to reduce further hydrocarbon ingestion.

9 Claims, 5 Drawing Sheets

(56) References Cited

U.S. PATENT DOCUMENTS

| | | | |
|---|---|---|---|
| 8,375,920 B2* | 2/2013 | Tsukamoto | F02D 17/02 123/198 F |
| 2002/0066436 A1 | 6/2002 | Majima et al. | |
| 2003/0070637 A1* | 4/2003 | Majima | F01L 9/04 123/90.15 |
| 2004/0050363 A1 | 3/2004 | Yamaoka et al. | |
| 2005/0193987 A1* | 9/2005 | Doering | F02M 63/0205 123/479 |
| 2005/0193988 A1* | 9/2005 | Bidner | F01L 13/00 123/481 |
| 2005/0197759 A1* | 9/2005 | Surnilla | F02P 5/1504 701/103 |
| 2005/0197761 A1* | 9/2005 | Bidner | F02P 5/045 701/105 |
| 2006/0288983 A1 | 12/2006 | Watanabe et al. | |
| 2007/0056560 A1* | 3/2007 | Trask | F01L 9/04 123/435 |
| 2007/0131203 A1 | 6/2007 | Ohga | |
| 2009/0007547 A1* | 1/2009 | Onodera | F01N 3/0235 60/286 |
| 2009/0292441 A1 | 11/2009 | Kawai et al. | |
| 2011/0083426 A1 | 4/2011 | Ikemoto et al. | |
| 2014/0318504 A1* | 10/2014 | Pearce | F02M 33/025 123/518 |

* cited by examiner

METHOD AND SYSTEM FOR ENGINE UNBURNED HYDROCARBON CONTROL

CROSS REFERENCE TO RELATED APPLICATIONS

The present application is a divisional of U.S. patent application Ser. No. 13/569,041, entitled "METHOD AND SYSTEM FOR ENGINE UNBURNED HYDROCARBON CONTROL," filed on Aug. 7, 2012, the entire contents of which are hereby incorporated by reference for all purposes.

BACKGROUND/SUMMARY

Engines may incur cylinder torque imbalances due to various reasons. These may include, for example, blocked injector nozzle holes, over-boost, fuel quality issues, and soot accumulation in cylinder. Engine control systems may be configured to address cylinder torque imbalances to improve engine performance.

One example approach for reducing cylinder imbalances is shown by Yamaoka et al. in U.S. Pat. No. 7,128,048. Therein, cylinder imbalances are identified based on deviations in cylinder pressure peak timings from a predetermined timing range. Based on whether the cylinder pressure peak timing in a given cylinder is retarded or advanced relative to the predetermined range, an engine controller may adjust an amount of internal EGR delivered to the affected cylinder. This allows an ignitability of the mixture in the cylinder to be improved, and an engine speed to be appropriately adjusted. If the deviation is sufficiently large, a compression ignition mode of engine operation may be inhibited to reduce engine degradation.

However, the inventors herein have recognized potential issues with such an approach. As an example, adjusting the amount of internal EGR may not reduce cylinder imbalances caused by hydrocarbon accumulation in an engine intake. For example, in some engine system, certain engine cylinders may be more prone to hydrocarbon accumulation due to the specific configuration of the engine intake system. Herein, increasing the amount of internal EGR may not help to release the hydrocarbons from those cylinders. As another example, hydrocarbons may accumulate at a charge air cooler and be forced from there into the engine during a tip-in. Increasing an amount of internal EGR may reduce the power provided during the tip-in without improving release of hydrocarbons from the charge air cooler. If left at the engine intake, the accumulated hydrocarbons may eventually spread from the affected cylinder to remaining cylinders, causing further cylinder imbalances and expediting engine degradation.

Thus in one example, some of the above issues may be addressed by a method of operating an engine comprising in response to cylinder imbalance and an elevated engine exhaust exotherm indicative of hydrocarbon oxidation, limiting engine speed and load to reduce hydrocarbon accumulation at an engine intake. In this way, hydrocarbon accumulation at one or more locations along an engine intake can be better addressed.

In one example, an engine may include a branched intake system providing air to each of a first and second group of cylinders. Due to the specific configuration of the intake system, air may flow from a throttle to a y-junction, and then from a first outlet of the y-junction to the first group of cylinders and from a first outlet of the y-junction to the second group of cylinders. A longitudinal axis of the first outlet of the y-junction may be aimed at a first cylinder positioned away from an end cylinder of the first group while a longitudinal axis of the second outlet of the y-junction may be aimed at the first cylinder positioned away from an end cylinder of the second group. Consequently, the first cylinder of the first group and the first cylinder of the second group may be more prone to hydrocarbon accumulation. An engine controller may determine cylinder imbalances based on crankshaft acceleration differences estimated during steady-state engine operating conditions (e.g., idling conditions) and/or transient engine operating conditions (e.g., during a tip-in). The crankshaft data may be estimated in different windows during steady-state conditions and transient conditions, the window varying based at least on the mass air flow during the respective condition. Due to higher background noise, the controller may perform significant signal processing of the crankshaft data received during the transient conditions, including debouncing of the signals, to differentiate cylinder imbalances arising due to engine intake hydrocarbon accumulation from cylinder imbalances arising due to air or fuel variations (e.g., from misfires) during the transient conditions. In addition, during conditions when an exhaust particulate filter is not regenerating, the controller may estimate exhaust temperature differences across an exhaust catalyst (such an exhaust oxidation catalyst).

In response to a cylinder imbalance detected while an exhaust exotherm is elevated, the controller may determine that there is oxidation of hydrocarbons that were accumulating at an engine intake. In particular, uncontrolled hydrocarbon accumulation may have occurred at various locations along the engine intake including at the crankcase, near the intake port of specific cylinders, and at or near a charge air cooler. In response to the indication, the controller may limit engine speed and load to reduce further hydrocarbon accumulation at the engine intake. The limiting may include limiting fuel injection to all engine cylinders including the imbalanced cylinder. The degree of limiting may be based on whether the cylinder imbalance was detected during transient conditions or steady-state conditions. For example, in response to cylinder imbalances and an elevated exotherm detected during transient conditions, the limiting may be higher and faster as a result of high Alpha and Beta error separation while in response to cylinder imbalances and elevated exotherms detected during steady state, the limiting may be lower and slower due to smaller Alpha and Beta error separation, requiring slower debounce rate. The controller may also elevate engine temperatures so as to release the accumulated hydrocarbons. Herein, the controlled oxidation or evaporation of the accumulated hydrocarbons increases tolerance to crankcase overfilling. Further still, the controller may set one or more diagnostic codes, illuminate an indication light, and set a cluster message to alert the vehicle operator that hydrocarbon accumulation at the intake was detected, so that the vehicle operator can take the vehicle to a service center before substantial engine degradation can occur.

In this way, by using crankshaft acceleration differences to identify cylinder imbalances during steady-state and transient engine operating conditions, and by correlating the cylinder imbalances with elevated exhaust exotherms, cylinder imbalances due to hydrocarbon accumulation at the engine intake can be better identified and distinguished from cylinder imbalances caused from hydrocarbon accumulation at other engine locations, and cylinder imbalances due to other engine conditions (e.g., those due to fuel injector variations). By limiting engine speed and load responsive to the indication of hydrocarbon accumulation at the engine intake, primary engine degradation caused by flow of the accumulating hydrocarbons into the engine during high air flow conditions (such as a tip-in), can be reduced. In addition, by limiting further accumulation of hydrocarbons at the engine intake, secondary engine degradation that could potentially arise from continued cylinder imbalances can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
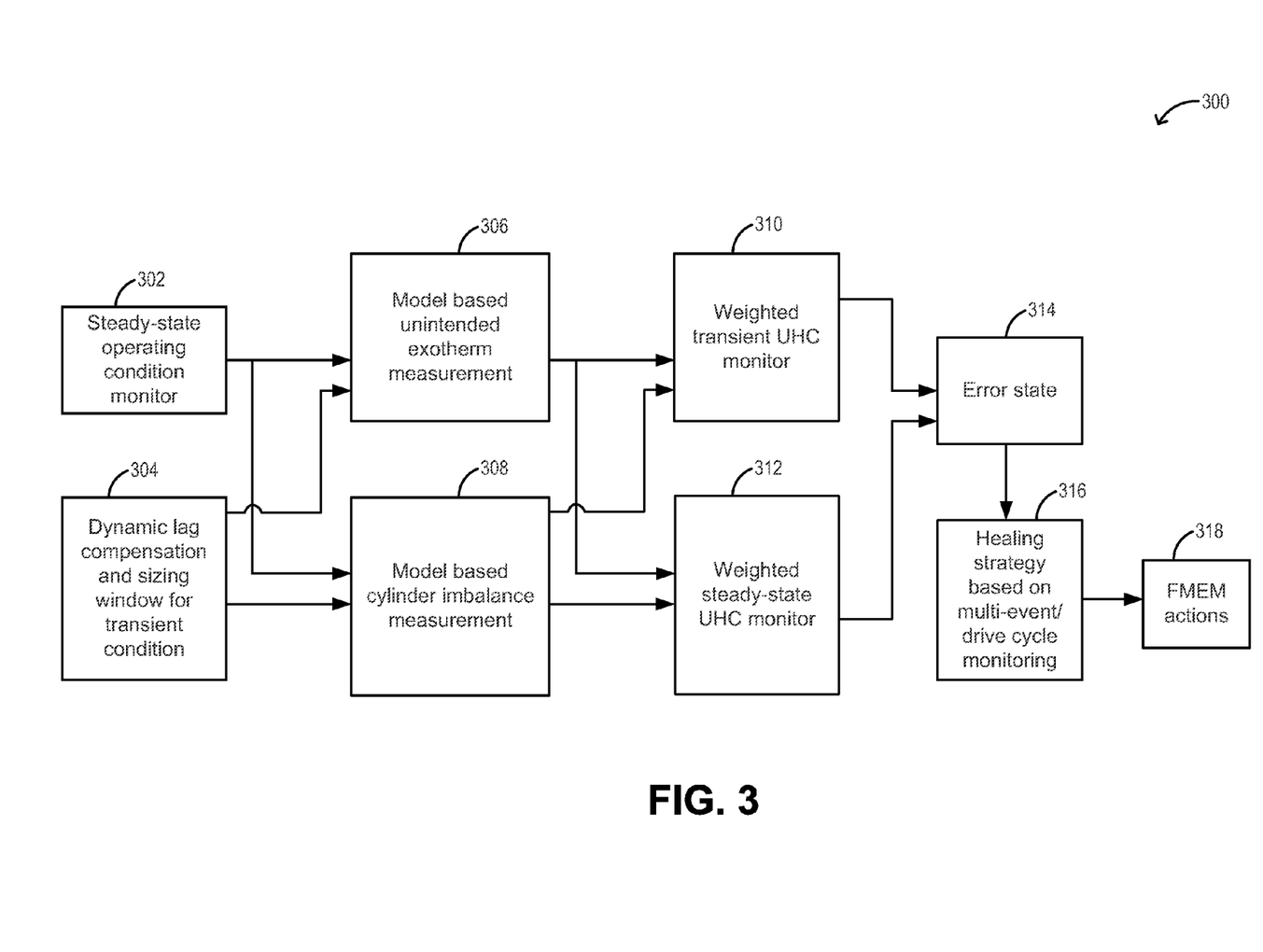
FIG. 3 shows a schematic depiction of a routine for detecting hydrocarbon accumulation at an engine intake based on cylinder imbalances and exhaust exotherms monitored during transient and steady-state conditions.
Figure 4:
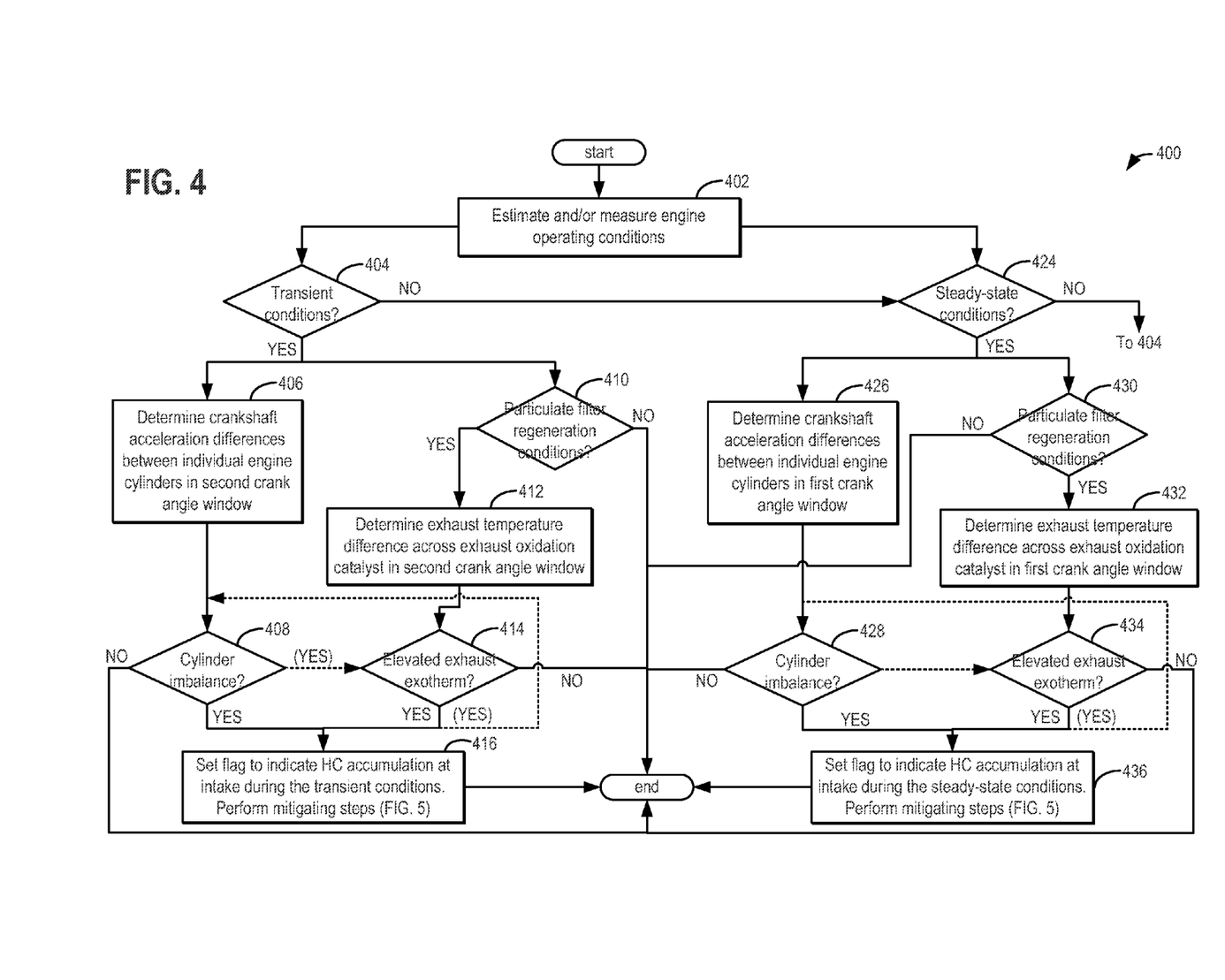
FIG. 4 shows a high level flow chart for identifying hydrocarbon accumulation at an engine intake based on cylinder imbalances and exhaust exotherms monitored during transient and steady-state conditions.

Methods and systems are described for indicating the imbalanced accumulation of hydrocarbons at selected locations of an engine intake (such as the engine system of FIGS. 1-2) based on correlations between cylinder imbalances and elevated exhaust exotherms. Crankshaft acceleration differences across individual engine cylinders and exhaust temperature differences across an exhaust catalyst are assessed during transient and steady-state engine operating conditions (FIG. 3). A controller may be configured to collect the data in distinct windows, perform distinct signal processing, and weigh the data differentially based on whether the data was collected during the steady-state or the transient condition (FIG. 4). Based on an indication of hydrocarbon accumulation at the engine intake, the controller may perform one or more mitigating steps (FIG. 5) including limiting fuel injection to all engine cylinders so as to expedite release of the accumulated hydrocarbons while reducing further accumulation at the intake. In this way, engine degradation arising from the accumulation of hydrocarbons at selected areas of an engine intake can be reduced.

Figure 1:
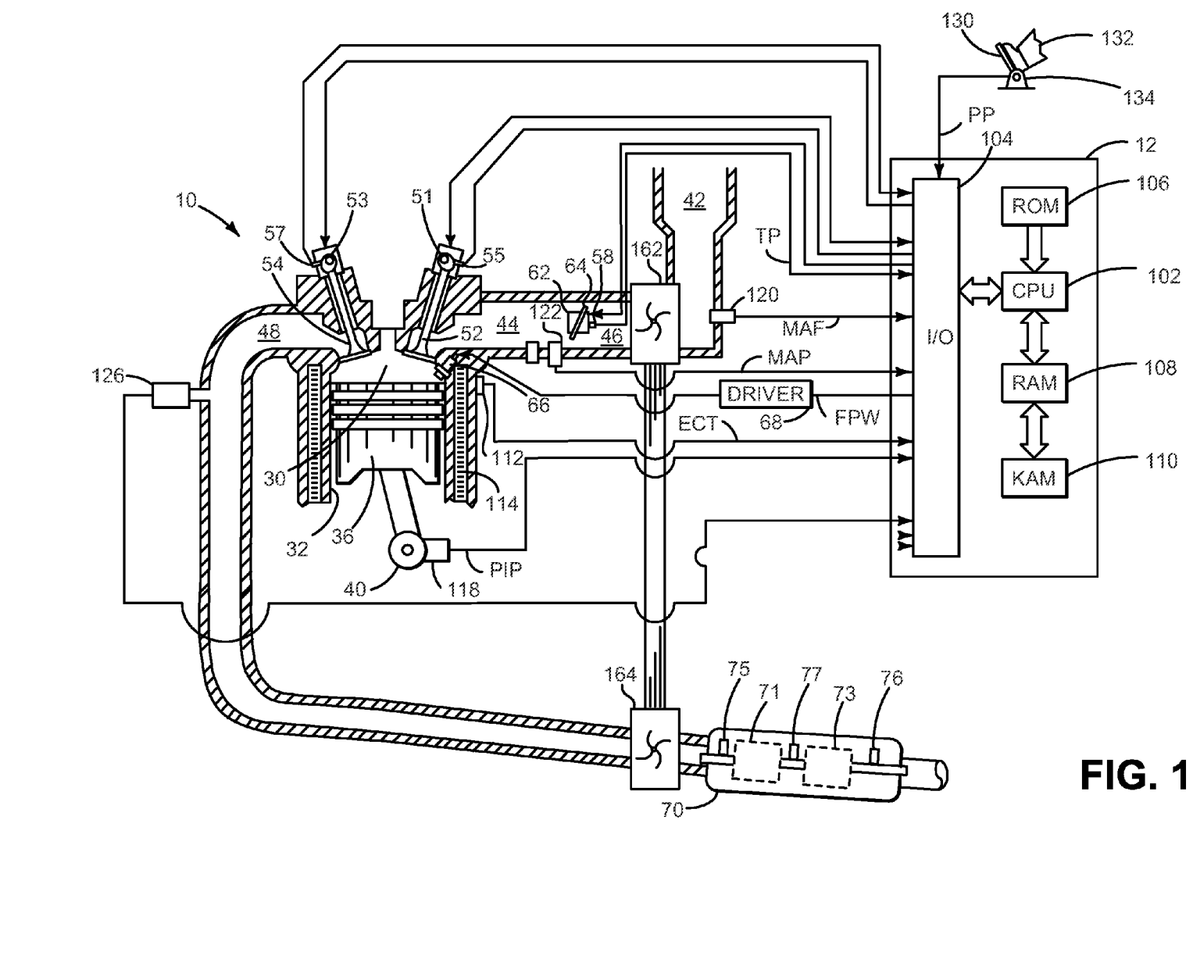
FIG. 1 shows a partial view of an engine system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162. A high pressure, dual stage, fuel system may be used to generate higher fuel pressures at injectors 66. An example configuration of an intake manifold of engine 10 is shown with reference to the engine system of FIG. 2.

Universal Exhaust Gas Oxygen (UEGO) sensor 126 is shown coupled to exhaust manifold 48 upstream of emission control device 70. Alternatively, a two-state exhaust gas oxygen sensor may be substituted for UEGO sensor 126.

Emission control device 70 can include one or more exhaust catalysts and particulate filters. In one example, as depicted, emission control device 70 may include a particulate filter 73 downstream of an exhaust oxidation catalyst 71. In other examples, emission control device 70 may include one or more of an SCR catalyst, a three-way catalyst, a light-off catalyst, an oxidation catalyst and a particulate filter. One or more temperature sensors may be coupled to emission control device 70 for estimating an exhaust exotherm. For example, a first temperature sensor 75 may be coupled upstream of emission control device 70, specifically upstream of exhaust oxidation catalyst 71 while a second temperature sensor 77 is coupled downstream of emission control device 70, specifically, downstream of particulate filter 73. Additionally, a third temperature sensor 76 may be coupled downstream of exhaust oxidation catalyst 71B to provide an estimate of an exhaust exotherm across the oxidation catalyst. Likewise, one or more exhaust air-to-fuel ratio sensors (e.g., UEGO, EGO, or HEGO oxygen sensors) may be coupled upstream and downstream of emission control device, including upstream and downstream of oxidation catalyst 71 and upstream and downstream of particulate filter 73.

As elaborated herein, during conditions when hydrocarbons are ingested into the engine, hydrocarbon accumulation can occur along the engine intake as well as at the engine exhaust, such as at particulate filter 73 and the region immediately upstream of oxidation catalyst 71. Oxidation of the accumulated hydrocarbons at the engine exhaust is an exothermic reaction that releases a large amount of energy at the emission control device. In particular, during conditions when the particulate filter is not being regenerated, the oxidation of the accumulated hydrocarbons causes a large amount of heat to be released downstream of the oxidation catalyst 71. The excess heat can lead to degradation of emission control device 70. By estimating a temperature difference across the oxidation catalyst during non-regeneration conditions, an elevated exotherm may be detected. By correlating the elevated exotherm with concomitant cylinder imbalances, hydrocarbon ingestion may be detected and engine degradation mitigating steps may be taken.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); a measurement of throttle position from sensor 58; a measurement of temperature differences across an emission control device from temperature sensors 75, 76, 77; and a measurement of air-to-fuel ratio differences across the emission control device from oxygen sensors (not shown) coupled upstream and downstream of emission control device 70. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Crankshaft acceleration data may also be obtained from engine position sensor 118. As elaborated herein with reference to FIGS. 3-4, the crankshaft acceleration data may be correlated with an elevated exhaust exotherm (determined based on exhaust temperature differences estimated by temperature sensors 75, 76, 77) during transient and steady-state engine operating conditions to indicate hydrocarbon accumulation at the engine intake. This may include hydrocarbon accumulation at selected cylinders (based on the configuration of the intake manifold, as discussed at FIG. 2) and/or accumulation near or on a charge air cooler coupled downstream of compressor 162. Based on the indication, controller 12 may limit engine speed and load to reduce further accumulation, thereby pre-empting engine degradation. For example, the limiting may reduce degradation of a cylinder piston and other engine components.

Returning to FIG. 1, in some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine system configured to respond to the simultaneous occurrence of cylinder imbalance and an elevated engine exhaust exotherm indicative of hydrocarbon oxidation by limiting engine speed and load to reduce hydrocarbon accumulation at an engine intake. A controller of the engine system may also raise an engine temperature to release or burn off the accumulated hydrocarbons. The controller may determine cylinder imbalances based on crankshaft acceleration differences between individual engine cylinders (such as cylinders on different engine banks), wherein the crankshaft acceleration is estimated during steady-state engine conditions and transient engine conditions. The crankshaft acceleration differences estimated during transient engine conditions may be estimated over a dynamically adapted window that is different from a window used during steady-state conditions, wherein the dynamically adapted window is adjusted based at least on a mass air flow during the transient condition. The exhaust exotherm may be determined based on exhaust temperature differences across an emission control device (such as the oxidation exhaust catalyst of FIG. 1) estimated during non-regeneration conditions (when the exhaust temperature is actively raised to burn soot and regenerate the exhaust particulate filter of FIG. 1). By using both exhaust exotherm data and cylinder imbalance data, hydrocarbon accumulation at an engine intake can be better identified and distinguished from other causes of cylinder imbalance, and appropriately addressed.

Figure 2:
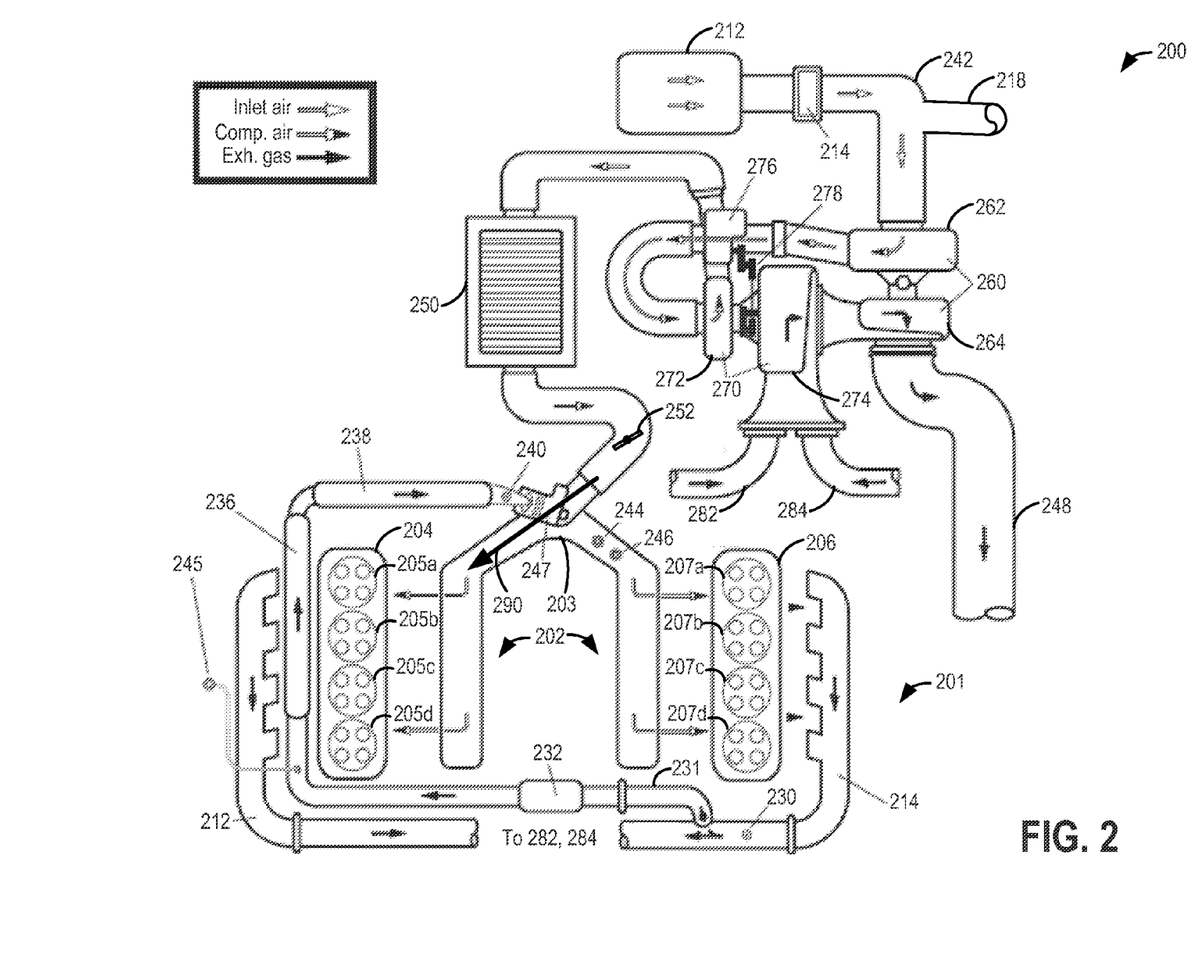
FIG. 2 shows an example configuration of an engine system.

Now turning to FIG. 2, an example embodiment 200 of an engine system (such as the engine system of FIG. 1) including engine 201 is shown with particular focus on the configuration of an engine intake manifold 202 that makes certain engine cylinders more prone to hydrocarbon accumulation. Fresh intake air, filtered through air cleaner 212 is delivered to engine 201 via intake passage 242. One or more sensors may be coupled to intake passage 242 downstream of the air cleaner, such as a MAP sensor and/or an intake air temperature sensor, so that engine operations can be adjusted based on the intake air conditions. Additional MAP and intake air temperature sensors may be coupled to the intake manifold. Engine 201 may be a boosted engine configured with one or more turbochargers. For example, engine 201 may be configured with a first, low pressure turbocharger 260 and a second, high pressure turbocharger 270. Low pressure turbocharger 260 includes a first compressor 262 configured to boost intake air. The first compressor 262 may be driven by the rotation of first turbine 264, coupled to exhaust passage 248. High pressure turbocharger 270 includes a second compressor 272, coupled downstream of first compressor 262, and configured to further boost the intake air. The second compressor 272 may be driven by the rotation of second turbine 274, coupled to exhaust passage 248, upstream of first turbine 264.

A turbocharger actuator 276, coupled to turbocharger actuator arms 278, is coupled between first compressor 262 and second compressor 272. Turbocharger actuator 276 is configured to enable the compressor to be operated using an electro-hydraulic actuator or electric motor. Air compressed by first (low pressure) compressor 262 is directed to second (high pressure) compressor 272 for further compression. The compressed intake air is cooled through charge air cooler 250 before being delivered to engine intake manifold 202.

In the depicted embodiment, engine 201 is configured with a branched intake manifold 202 leading to two banks or groups of cylinders 204, 206. First group of cylinders 204 located on the left side of intake manifold 202 includes a plurality of cylinders 205a-d (herein, four) while second group of cylinders 206 located on the right side of intake manifold 202 includes a plurality of cylinders 207a-d (herein, four). Intake air may flow along intake passage 242 from throttle 252 (downstream of charge air cooler 250) into a y-junction 203 (or y-tube) of the intake manifold 202. A first outlet 208 of the y-junction 203 may flow air into the first group of cylinders 204 (herein, the left intake manifold) while a second outlet 210 of the y-junction 203 may flow air into the second group of cylinders 206 (herein the right intake manifold). The specific arrangement of the branches or outlets of the y-junction may be such that a longitudinal axis of each outlet is aimed towards certain cylinders of the respective cylinder group. In the depicted example, a longitudinal axis of the first outlet 208 of the y-junction 203 is aimed at a first cylinder, cylinder 205a positioned away from an end cylinder (herein, cylinder 205d) while a longitudinal axis of the second outlet 210 of the y-junction 203 is aimed at a second cylinder, cylinder 207a positioned away from an end cylinder (herein, cylinder 207d). In particular, the arrangement of the branched intake manifold causes cylinders 205a and 207a to be located closest to the respective outlet of the y-junction.

Intake manifold 202 may include one or more sensors, such as temperature, pressure and air-to-fuel ratio sensors. For example, MAP sensor 244 and intake air temperature (IAT) sensor 246 is shown coupled to intake manifold 202 at y-junction 203.

While engine intake manifolds are typically designed to evenly distribute air (and EGR) to individual cylinders, the presence of uncontrolled hydrocarbons in the intake flow stream can cause uneven distribution. Uncontrolled hydrocarbons may entering anywhere from the intake system, such as from upstream of sensor 214, all the way to an active particulate filter in the exhaust system. The uncontrolled hydrocarbons may include, for example, hydrocarbons from fuel, engine oil, and coolant. As one example, a mixture of excess fuel and oil may be vented from the engine crankcase into the intake passage 242 via crankcase ventilation tube 218. The excess fuel and oil may enter the crankcase due to fuel leaking from a high pressure fuel system delivering fuel to injectors, oil entering from infrequent oil changes, as well as fuel entering from frequent regeneration of an exhaust particulate filter. As another example, oil may enter the intake due to an oil leak in the seal of the high pressure turbocharger 270. As still another example, coolant may leak into the intake from EGR cooler 230. Still other sources of hydrocarbon leak may include in-cylinder fuel leak paths, stuck open injectors, cracked injectors, leaky injectors, radiator leaks, EGR cooler leaks, etc.

During transient engine operation, a sudden charge rush into engine cylinders can dislodge uncontrolled hydrocarbon (UHC) liquid pockets, carrying a spray of UHCs in Gas-Liquid phase unevenly into cylinders, due to fluid dynamics associated with droplet inertia. This uneven UHC distribution causes cylinder imbalance. Fluid inertia may cause certain cylinders, such as cylinders 205a, 205d, 207a and 207d of the depicted engine configuration, to easily ingest more hydrocarbons than other cylinders. As such, the cylinders affected largely vary depending on the design and configuration of the Y-junction and the intake manifold of the engine system.

Specifically, in the depicted engine configuration, the inlet to intake manifold 202 curves coming in from right to left (see curve of intake passage in the vicinity of throttle 252). As a result, the left side of the intake manifold (that is, first group of cylinders 204) gets the most amount of uncontrolled hydrocarbon fluid (as indicated by arrow 290). Because the intake manifold then turns straight along the cylinder head, the majority of hydrocarbon fluid accumulation will subsequently happen at the end of the manifold such that cylinder 205d will eventually get the most hydrocarbon fluid. In addition, cylinder 205a will also get a share of the hydrocarbon fluid. Specifically, the turn/curve of the intake manifold will deflect the flow, but due to the turbulence created at that location, there will also be some flow of hydrocarbons ingested into cylinder 205a.

Since the uncontrolled hydrocarbons are in a liquid-vapor phase, and the fuel particles are heavier than air, they tend to be unevenly distributed when ingested into the engine cylinders. With reference to the example engine embodiment of FIG. 2, any debris, such as uncontrolled hydrocarbons from fuel and oil, ingested into the engine will tend to settle and accumulate at cylinders 205a and 207a. In addition, there may be accumulation at cylinder 205d. This accumulation can lead to substantial cylinder imbalances and an elevated exotherm upon oxidation of the uncontrolled hydrocarbons at the exhaust catalyst.

In particular, in compression ignition engines (such as diesel engines), the heterogeneous localized lean combustion causes the hydrocarbons to combust, generating soot and heat from the exothermic reaction. Likewise, the uneven hydrocarbon distribution causes excessive crankshaft acceleration in some cylinders. For example, the hydrocarbons can ignite within a combustion chamber and cause engine over-speed and run-away conditions. In one example, cylinder balance may refer to a fuel injector energizing time correction applied to a specific cylinder so as to make the specified cylinder behave like the other engine cylinders in its ability to produce peak crankshaft acceleration. Thus, a cylinder producing more than expected or less than expected crankshaft acceleration is determined to exhibit cylinder imbalance. As elaborated herein, cylinder imbalances may be determined based on crankshaft acceleration differences. For example, by comparing the peak acceleration (that is, the crankshaft acceleration at which peak cylinder pressure is achieved) of each cylinder against a modeled threshold, cylinder imbalances may be detected. These cylinder imbalances detected simultaneously with elevated exhaust exotherms reflect hydrocarbon oxidation resulting from uncontrolled hydrocarbon accumulation at the engine intake. As such, if left uncontrolled, the accumulation may continue to build up and eventually spill into other cylinders, leading to substantial engine degradation.

In one example, if a larger amount of debris accumulates at cylinder 205a (on the left side of the engine intake), cylinder imbalance related issues may largely occur at the second group of cylinders on the right side of the intake manifold. As another example, if a larger amount of debris accumulates at cylinder 207a (on the right side of the engine intake), cylinder imbalance related issues may largely occur at the first group of cylinders on the left side of the intake manifold.

Uncontrolled hydrocarbons can also accumulate at charge air cooler 252. Specifically, as the various oil and fuel leaks drain into the crankcase, the crankcase fluid volume increases. As the volume increases above the crankshaft level, the rotating crankshaft blends the excess fuel and oil with intake air into a foaming oil mixture. Crankcase ventilation tube 218 can then transport the foamed oil mixture into the intake passage 242, upstream of the turbocharger compressors 262 and 272. In the case of coolant leaking from the EGR cooler, and oil leaking from the turbocharger seal, the uncontrolled hydrocarbons can pass directly from the respective component into the intake passage. The compression of the oil/fuel mixture by the turbochargers and passage through the charge cooler causes the uncontrolled hydrocarbon vapor mixture to condense in various pockets of the intake system, in particular, within charge air cooler 252. During transient engine operation, such as during a tip-in, the sudden rush of charge into cylinders can dislodge the liquid pockets of uncontrolled hydrocarbons, carrying a spray of the hydrocarbons in gas-liquid phase unevenly into the cylinders, largely due to the fluid dynamics associated with droplet inertia. As discussed above, the uneven distribution can cause cylinder imbalance. Partially combusted hydrocarbons entering the exhaust system can trigger uncontrolled rate of oxidation, leading to elevated exhaust exotherms (e.g., a temperature rise of up to 65 degrees Celsius per second within the exhaust oxidation catalyst).

Returning to FIG. 2, combustion products from first group of cylinders 204 may be released into a first exhaust manifold 212 while combustion products from second group of cylinders 206 may be released into second exhaust manifold 214. At least a portion of the exhaust may be used to spin the turbocharger turbines before being released to the atmosphere. For example, exhaust may be directed from exhaust manifolds 212, 214 through second turbine 274 via passages 282, 284.

Additionally, during conditions when exhaust gas recirculation is requested (such as when engine dilution is required), at least a portion of the exhaust may be diverted back to the engine intake, downstream of throttle 252, via EGR passage 231. In the depicted embodiment, EGR passage 231 is shown diverting exhaust from second exhaust manifold 214 although it will be appreciated that in alternate embodiments, exhaust may be diverted from first exhaust manifold 212 and/or both exhaust manifolds 212 and 214. EGR passage may include an emission control device, such as oxidation catalyst 232, for treating exhaust gas recirculated to the engine cylinders. One or more EGR coolers, such as a first (horizontal) EGR cooler 236 and a second (vertical) EGR cooler 238 may be included in EGR passage 231 for cooling the exhaust gas before delivery to the cylinders, thereby providing cooled EGR benefits to the engine. By adjusting an opening of EGR valve 247, an amount of exhaust gas recirculated to the engine intake can be adjusted. One or more sensors, such as temperature, pressure, and/or air-to-fuel ratio sensors, may be coupled to the EGR system for controlling an amount, timing, composition, as well as a temperature of the exhaust gas diverted to the engine intake. For example, a first EGR inlet sensor 230 (temperature or air-to-fuel ratio sensor) may be coupled upstream an inlet of EGR passage 231 while a second EGR outlet sensor 240 (temperature or air-to-fuel ratio sensor) may be coupled upstream an outlet of EGR passage 231, such as upstream of EGR valve 240. As another example, an exhaust pressure sensor 245 may be included in EGR passage 231.

Figure 5:
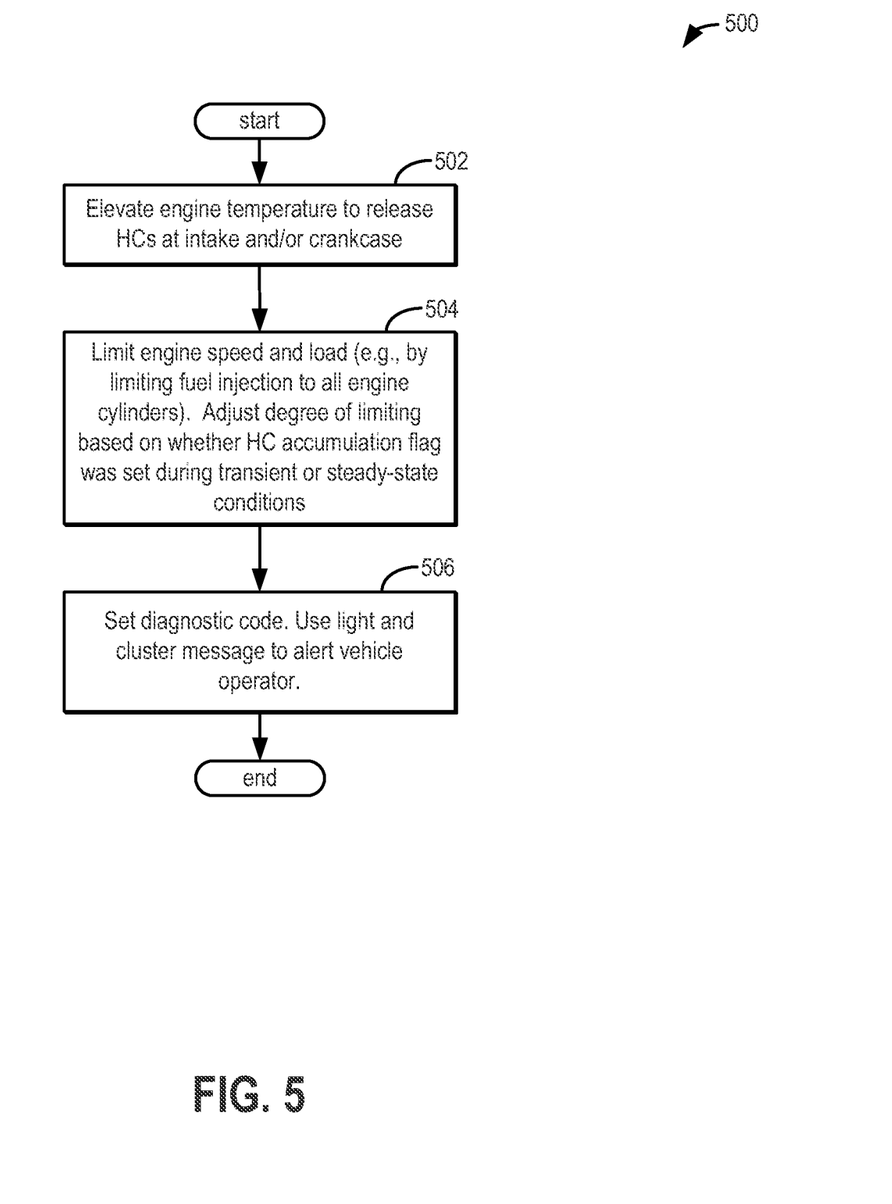
FIG. 5 shows a high level flow chart for mitigating action performed responsive to an indication of hydrocarbon accumulation at an engine intake.

As elaborated herein with reference to the model of FIG. 3 and the routines of FIGS. 4-5, an engine controller may be configured to determine hydrocarbon oxidation based on an elevated exhaust exotherm, and based on the detection of cylinder imbalances while the exhaust exotherm is elevated, the controller may infer hydrocarbon accumulation at the engine intake. Accordingly, the controller may perform one or more actions, including limiting an engine speed and load, so as to reduce further accumulation and release of hydrocarbons into the intake. In doing so, the incipient cylinder imbalance can be addressed and further cylinder imbalances and potential engine degradation due to the accumulating hydrocarbons can be reduced. In addition, degradation of exhaust system components, such as oxidation catalysts and particulate filters, due to the elevated exhaust exotherm can also be reduced.

Now turning to FIG. 3, it shows a schematic representation (or block diagram) of a method 300 for detecting ingestion of hydrocarbons at an engine intake and rapidly reacting to the ingestion to mitigate critical engine degradation. As such, the method of FIG. 3 is a block diagram depiction of the algorithm used in the routines of FIGS. 4-5.

Method 300 includes a steady-state operating condition monitor 302 for continuously detecting and estimating engine steady state operating conditions. In addition, a transient state monitor 304 is provided for continuously detecting and estimating transient engine operating conditions. The transient state monitor 304 includes dynamic lag compensation and a dynamically adjusted sizing window in which the transient conditions are assessed. The window (e.g., the start and end points of the window in which monitoring occurs) are based at least on the amount of tip-in (e.g., based on accelerator pedal movement during a tip-in). The dynamic lag compensation allows for the simultaneous weighted monitoring of cylinder imbalances and exhaust exotherms so as to accelerate the detection of hydrocarbon ingestion. The dynamically adapted window is a window in which transient cylinder imbalance data is measured and may be adjusted dynamically based on transient engine conditions. For example, when the transient condition is a tip-in, the window may be based on the mass air flow, rate of change of mass air flow, and/or amount of tip-in (as determined by accelerator pedal movement during the tip-in).

Various noise filtering techniques are used to analyze the crankshaft acceleration data so as to eliminate noise factors such as misfire, humidity, fuel quality. These filtering techniques may include, for example, noise rejection strategies, noise filtering techniques such as debouncing algorithms, deviation accumulation counters, etc. The function of the debouncing algorithm is to accelerate the time to set fault, depending on the magnitude of error. When the cylinder imbalance and/or exotherm is high, then the fault flag is set sooner. In addition, the debouncing algorithm clips a maximum value of the counter and resets the counter to zero when entry conditions are not met. This allows adequate maturity of the fault before a fault flag is set. In this way, an enhanced cylinder imbalance algorithm is provided that operates under transient engine conditions, in addition to idle state conditions.

Data pertaining to each of the transient state conditions, as determined by the transient state monitor 304, and the steady-state conditions, as determined by the steady-state monitor 302, may be fed, in parallel, into a model based unintended exotherm measurement block 306 and a model based cylinder imbalance measurement block 308. The model used in model based cylinder imbalance measurement block 308 may be based on engine operating parameters such as engine speed, fuel injected, mass air flow (MAF) and inlet air temperature (IAT). Based at least on these parameters, the model may determine an amount of piston acceleration.

The output from each of blocks 306 and 308 are fed, in parallel, to a weighted steady-state uncontrolled hydrocarbon (UHC) monitor 312 and a weighted transient UHC monitor 310. Based on the comparison between monitors 310, 312, an error state 314 may be identified. In particular, in response to an exotherm detected by model 306 and a cylinder imbalance detected by model 308 during steady-state conditions, weighted steady-state UHC monitor 312 may determine hydrocarbon ingestion at the engine intake and hydrocarbon oxidation at the engine exhaust during steady-state conditions. Likewise, in response to an exotherm detected by model 306 and a cylinder imbalance detected by model 308 during transient conditions, weighted transient UHC monitor 310 may determine hydrocarbon ingestion at the engine intake and hydrocarbon oxidation at the engine exhaust during transient conditions. Further, by comparing the outputs of monitors 310 and 312, an error state 314 may be determined and a flag may be set. By using and comparing data received during transient as well as steady-state conditions, even minor cylinder imbalances and exhaust exotherms can be better detected. Additionally, the cylinder imbalance data can be correlated with the exhaust exotherm data with a higher degree of confidence, thereby improving the detection of hydrocarbon ingestion. By improving the accuracy and robustness of the detection strategy, hydrocarbon ingestion can be detected and addressed before hydrocarbons accumulate in the engine intake to levels that can lead to substantial engine component degradation.

In response to the detection of error state 314, a healing strategy 316 may be performed that is based on multi-event or multi-drive cycle monitoring. The multi-drive cycle monitoring includes the ability to monitor error state 314 over multiple drive cycles before initiating mitigating FMEM actions such as derating of torque. Fault Healing can also be calibrated to progressively heal over multiple drive cycles, so that a fault can be set quickly if the error state is too frequent. The healing strategy includes various engine degradation mitigation steps, as well as failure models and effects management (FMEM) actions 318. Actions performed as part of the healing strategy include limiting of an engine speed and load. In one example, engine speed and load is limited by decreasing fuel injection to all engine cylinders including the engine cylinder where imbalance (e.g., engine over speed) was detected as well as other cylinders not yet incurring cylinder imbalance. The engine speed reduction reduces crankcase foaming and increases tolerance of the engine to crankcase overfilling. In addition, the limiting of engine speed and loads allows peak cylinder pressures to be reduced. In other examples, engine speed and load may be further limited by reducing an opening of the throttle, reducing an amount of engine boost, increasing an amount of EGR, etc.

Additional healing strategy steps include increasing an engine temperature to release some of the accumulated hydrocarbons. In particular, the controlled combustion of accumulated hydrocarbons allows cylinder damage to be reduced and/or contained. Still other healing strategy steps include alerting the vehicle operator so that the operator can take the vehicle to a service center for further assessment. The vehicle operator may be alerted using a cluster message displayed on a dashboard display screen, or via the illumination of a malfunction indication light (or wrench light). Further still, various diagnostic codes may be set that can be retrieved by a service person at the service center and used for better traceability of the hydrocarbon ingestion issue.

Now turning to FIG. 4, method 400 depicts a routine for continuously assessing and monitoring crankshaft acceleration data and exhaust temperature data, during steady-state and transient engine operating conditions, so as to reliably detect and indicate hydrocarbon ingestion at an engine intake. Mitigating steps that may be performed in response to the indication, so as to reduce engine degradation, are elaborated in the routine of FIG. 5. As such, the routines of FIGS. 4-5 use the algorithms previously introduced at FIG. 3.

At 402, the method includes estimating and/or measuring engine operating conditions. These include, for example, engine speed and load, driver torque demand, exhaust temperature, exhaust catalyst temperature, boost level, ambient conditions (ambient temperature, pressure, humidity, etc.), manifold pressure, manifold air flow, etc.

At 404, it may be determined if engine transient conditions are present. In one example, engine transient conditions may be determined if a rate of change in the mass air flow is higher than a threshold rate, such as during a tip-in or tip-out. If transient conditions are not confirmed, then at 424, the routine includes determining if engine steady-state conditions are present. In one example, engine steady state conditions may be determined if the rate of change in the mass air flow is lower than a threshold rate. In another example, engine steady-state conditions may be determined if the engine is at an engine idling speed.

Upon confirming transient conditions, at 406, crankshaft acceleration differences between individual engine cylinders may be determined. Likewise, upon confirming steady-state conditions, at 426, crankshaft acceleration differences between individual engine cylinders may be determined. In particular, the crankshaft acceleration differences are estimated in a first window when the engine is in steady-state conditions, and estimated in a second, different window when the engine is in transient conditions. As such, the second window may be dynamically adjusted during the transient engine conditions based at least on the mass air flow, or rate of change in mass air flow during the transient engine condition. In comparison, the first window may be based on engine speed and load being stable. In addition to entry conditions that define specific windows for steady-state and transient conditions, a core set of entry conditions that are based on vehicle speed, ambient temperature, coolant temperature, PTO state, input error states, etc., may be applied for determining both the first window during steady-state conditions and the second window during the transient conditions. For example, the windows may be wider or narrower depending on the degree of cylinder imbalance and the magnitude of the exotherm. For example, for the same level of an error state, the first window may be smaller than the second window.

Various noise filtering techniques and algorithms may be used to filter the crankshaft acceleration data in each window. For example, the inter-cylinder crankshaft acceleration differences in the first window may be debounced during the steady-state conditions. Likewise, the inter-cylinder crankshaft acceleration differences in the second window may be debounced during the transient conditions.

At 408, based on the crankshaft acceleration data estimated during the transient conditions (at 406), cylinder imbalance may be determined. Likewise, at 428, based on the crankshaft acceleration data estimated during the steady-state conditions (at 426), cylinder imbalance may be determined. In one example, the engine includes distinct banks with cylinder grouped therein, such as a first bank with a first cylinder group and a second bank with a second cylinder group. Therein, cylinder imbalance is determined based on crankshaft acceleration differences between individual engine cylinders of each of the first and second group of cylinders, the crankshaft acceleration estimated during each of steady-state engine conditions and transient engine conditions.

In one example, cylinder balance may be estimated as a fuel injector energizing time correction required for a cylinder to make that cylinder behave like other engine cylinders in its ability to produce a peak crankshaft acceleration. Thus, if a cylinder over-produces or under-produces crankshaft acceleration relative to the other cylinders (such as other cylinders in the same group), cylinder imbalance may be determined. If cylinder imbalance is not determined at 408 or 428, the routine may end.

If cylinder imbalance is determined at 408, based on the crankshaft acceleration differences in the second crank angle window, then at 416, the controller may set a flag or diagnostic code to indicate hydrocarbon accumulation at the engine intake during the transient conditions. Specifically, the flag may indicate that hydrocarbon accumulation at the engine intake during the transient conditions has exceeded an allowable limit, as determined by a model. Likewise, if cylinder imbalance is determined at 428, based on the crankshaft acceleration differences in the first crank angle window, then at 436, the controller may set a flag or diagnostic code to indicate hydrocarbon accumulation at the engine intake during the steady-state conditions. Specifically, the flag may indicate that hydrocarbon accumulation at the engine intake during the steady-state conditions has exceeded an allowable limit, as determined by a model. As such, the flag, or diagnostic code, used to indicate hydrocarbon accumulation during the transient conditions may be different from the flag or diagnostic code used to indicate hydrocarbon accumulation during the steady-state conditions. The modeled values against which the hydrocarbon accumulation is assessed at 436, during steady-state conditions, may be determined as a function of engine speed and ambient temperature.

In parallel to steps 406 and 408, at 410, it may be determined if a particulate filter is being regenerated. Likewise, in parallel to steps 426 and 428, at 430, it may be determined if the particulate filter is being regenerated. As such, the engine exhaust may include one or more emission control devices such as a particulate filter and an exhaust oxidation catalyst positioned upstream of the particulate filter. During conditions where the particulate filter is regenerated, an exhaust temperature at the emission control device may be actively elevated so as to burn off soot and particulate matter accumulating at the particulate filter. Thus, to allow elevated exotherms experienced due to active filter regeneration to be distinguished from those caused due to hydrocarbon ingestion, the routine proceeds only upon confirming that non-regeneration conditions are present.

At 412 and 432, an exhaust exotherm is estimated during transient and steady-state conditions, respectively. The exhaust exotherm may be estimated during the first window during the steady-state conditions and during the second window during the transient conditions. The exotherm may be based on an exhaust temperature difference across the exhaust oxidation catalyst. Thus, at 412, an exhaust temperature difference across the exhaust oxidation catalyst is estimated during engine transient conditions, in the second window, when the particulate filter is not being regenerated. Likewise, at 432, an exhaust temperature difference across the exhaust oxidation catalyst is estimated during engine steady-state conditions, in the first window, when the particulate filter is not being regenerated. Next, at 414 and 434, it may be determined if there is an elevated exotherm. For example, it may be determined if the estimated exhaust temperature difference across the exhaust oxidation catalyst is higher than a threshold difference.

As such, if an elevated exotherm is not confirmed, the routine may end. In comparison, if an elevated exotherm is determined in the first window during steady-state conditions, or during the second window during transient conditions, then at 416 and 436, the controller sets an appropriate flag or diagnostic code to indicate that hydrocarbon accumulation had exceeded an allowable limit.

While the above steps elaborate identification of hydrocarbon ingestion at the engine intake during transient conditions or steady-state conditions based on either cylinder imbalance or an elevated exotherm in a defined crank angles window, the indication of hydrocarbon ingestion may also be performed based on the simultaneous occurrence of each of cylinder imbalance and an elevated exotherm in the defined windows. In particular, cylinder speed variations may be caused due to various factors such as fuel injector variations, cylinder charge variations, misfires, and the ingestion of hydrocarbons (such as fuel and/or oil). Likewise, elevated exhaust exotherms may be caused due to various factors. Herein, the inventors have recognized that by correlating cylinder imbalances with elevated exhaust exotherms, cylinder imbalances caused due to fuel injector variations or misfires can be better distinguished from those caused by hydrocarbon ingestion, thereby allowing appropriate mitigating steps to be taken. This includes enabling the hydrocarbon ingestion to be detected earlier and/or more accurately.

For example, following determination of cylinder imbalance during transient conditions at 408, the routine may optionally proceed to 414 to determine if an elevated exotherm occurred simultaneously, in the same window. If yes, then at 416, in response to the simultaneous occurrence of each of cylinder imbalance and an elevated exhaust exotherm, hydrocarbon ingestion may be determined and the controller may set the flag to indicate hydrocarbon accumulation at the engine intake during transient conditions has exceeded an allowable limit, as determined by a model. As another example, following determination of an elevated exotherm during transient conditions at 414, the routine may optionally proceed to 408 to determine if cylinder imbalance occurred simultaneously, in the same window. If yes, then at 416, the controller may set the flag to indicate hydrocarbon ingestion at the engine intake during the transient conditions. It will be appreciated here that setting of the flag to indicate hydrocarbon ingestion may occur earlier in response to the simultaneous occurrence of cylinder imbalance and an elevated exotherm as compared to the setting of a flag responsive to either cylinder imbalance or an elevated exotherm.

In the same manner, following determination of cylinder imbalance during steady-state conditions at 428, the routine may optionally proceed to 434 to determine if an elevated exotherm occurred simultaneously, in the same window. If yes, then at 436, in response to the simultaneous occurrence of each of cylinder imbalance and an elevated exhaust exotherm, hydrocarbon ingestion may be determined and the controller may set the flag to indicate hydrocarbon accumulation at the engine intake during steady-state conditions has exceeded an allowable limit, as determined by a model. As another example, following determination of an elevated exotherm during steady-state conditions at 434, the routine may optionally proceed to 428 to determine if cylinder imbalance occurred simultaneously, in the same window. If yes, then at 436, the controller may set the flag to indicate hydrocarbon ingestion at the engine intake during the steady-state conditions. It will be appreciated here that setting of the flag to indicate hydrocarbon ingestion may occur earlier in response to the simultaneous occurrence of cylinder imbalance and an elevated exotherm as compared to the setting of a flag responsive to either cylinder imbalance or an elevated exotherm.

It will be appreciated that the weighting of the cylinder imbalance data and the exhaust exotherm data in determining hydrocarbon ingestion, during conditions when both are assessed, may be different based on whether the cylinder imbalance was detected during transient conditions or steady-state conditions. For example, indicating based on each of crankshaft acceleration differences and exhaust temperature differences may include weighing the crankshaft acceleration differences with a first weight factor and weighing the exhaust temperature differences with a second, different weight factor, the first and second weight factors based at least on whether the crankshaft acceleration differences were estimated during transient conditions or steady-state conditions.

After indicating hydrocarbon accumulation at the engine intake, in response to cylinder imbalance and/or an elevated engine exhaust exotherm indicative of hydrocarbon oxidation, one or more mitigating steps may be performed at 416 and 436. As elaborated at FIG. 5, these may include, for example, limiting an engine speed and load to reduce hydrocarbon accumulation at the engine intake.

Now turning to FIG. 5, method 500 depicts a routine for performing various mitigating steps responsive to an indication of hydrocarbon ingestion during transient or steady-state engine conditions. Hydrocarbon ingestion may be determined based on each of inter-cylinder crankshaft acceleration differences (or cylinder imbalance) experienced while an exhaust exotherm is elevated during the transient or steady-state engine conditions.

At 502, the routine includes elevating an engine temperature to release the hydrocarbons accumulated at the engine intake. Herein, the controlled combustion of the ingested hydrocarbons allows the hydrocarbon load at the engine intake to be reduced and further cylinder imbalances to also be reduced.

At 504, the routine includes limiting an engine speed and load. Specifically, the limiting includes limiting fuel injection to all engine cylinders. In one example, where the engine includes a first and a second cylinder, hydrocarbon accumulation may be indicated in the first cylinder based on each of crankshaft acceleration differences between the first cylinder and a second cylinder while exhaust temperature differences across an exhaust catalyst are above a threshold. Responsive thereto, fuel injection to each of the first and second cylinders may be limited to reduce engine speed and load. Herein, by reducing the engine speed, engine crankcase foaming that can lead to hydrocarbon ingestion is reduced.

A degree of the limiting is based on whether crankshaft acceleration differences were identified during transient engine conditions or steady-state engine conditions. For example, the limiting may include limiting fuel injection to all engine cylinders (e.g., each of the first and second cylinder in the above example) by a first, larger amount when the engine is in steady-state conditions, and limiting fuel injection to all engine cylinder (e.g., each of the first and second cylinder in the above example) by a second, smaller amount when the engine is in transient conditions. In addition, the amount of limiting may be based on the degree of cylinder imbalance and the degree of elevation of the elevated exhaust exotherm.

At 506, the routine further includes setting a diagnostic code and illuminating a malfunction light to indicate the hydrocarbon accumulation at the engine intake. In one example, different diagnostic codes may be set based on whether the indication of hydrocarbon ingestion was received during transient conditions or steady-state conditions. The malfunction light may be, for example, a wrench light. In addition, the light may be accompanied by a cluster message displayed on dashboard screen (or panel) so as to alert the vehicle operator. The light and messages may be used to alert the vehicle operator to take the vehicle to a service center for further service. By alerting the vehicle operator to get the vehicle serviced as soon as possible, primary engine degradation due to the ingestion of hydrocarbons is reduced. Additionally, secondary engine degradation from the cylinder imbalance and elevated exotherm can be reduced.

In one example, during a first engine steady-state condition, a controller may indicate hydrocarbon (HC) accumulation at an engine intake based on inter-cylinder crankshaft acceleration differences and an elevated exhaust exotherm estimated in a first window during the steady-state condition. During a second engine transient condition, the controller may indicate HC accumulation at an engine intake based on inter-cylinder crankshaft acceleration differences and an elevated exhaust exotherm estimated in a second window during the transient condition. During both the first and second conditions, the controller may limit fuel injection to all engine cylinders responsive to the indication.

Herein, the first window during the steady-state condition is based on engine speed and torque (such as stable engine speed and torque) and the second window during the transient condition is based on tip-ins. For example, the first window may be wider than the second window. The controller may also perform extensive noise filtering in each window. For example, the controller may debounce the inter-cylinder crankshaft acceleration differences in the first window during the first steady-state condition and debounce the inter-cylinder crankshaft acceleration differences in the second window during the second transient condition.

The limiting of fuel injection to all engine cylinders responsive to the indication may include limiting fuel injection with a first weight factor if the indication was received during an engine steady-state condition and limiting fuel injection with a second weight factor if the indication was received during an engine transient condition, the first weight factor higher than the second weight factor. For example, the controller may limit fuel injection by a first, larger amount to all engine cylinders during the first steady-state condition, and limiting fuel injection by a second, smaller amount to all engine cylinders during the second transient condition. In addition, the amount of limiting may be based on the degree of cylinder imbalance and the degree of elevation of the elevated exhaust exotherm.

As another example, during a first tip-in, the controller may indicate HC accumulation at an engine intake based on inter-cylinder crankshaft acceleration differences and an exhaust exotherm estimated in a first window while during a second tip-in, indicating HC accumulation at an engine intake based on inter-cylinder crankshaft acceleration differences and an exhaust exotherm estimated in a second, different window. Then, during both the first and second tip-ins, a debounce counter may be incremented. When the debounce counter is above a modeled threshold value, the fuel injection may then be limited to all engine cylinders responsive to the indication.

Herein, the start of the first window may be based on a rate of change of mass air flow through the engine during the first tip-in while the start of second window is based on a rate of change of mass air flow through the engine during the second tip-in. The duration of both window openings may be a function of mass air flow. In comparison, fuel injection may not dependent on rate of change of mass air flow but used only for determining the opportunistic window within which both cylinder imbalance and monitoring of an exhaust exotherm across the DOC needs to occur.

In this way, crankshaft acceleration data may be processed in different windows based on whether the data was received during steady-state conditions or transient conditions. By using data processed during transient and idle/steady-state conditions, cylinder imbalances caused by hydrocarbon ingestion may be detected more reliably. Likewise, the limiting responsive to the indication of hydrocarbon ingestion may be adjusted differently based on whether the indication was received during steady-state conditions or transient conditions so as to better mitigate the hydrocarbon accumulation.

In one example, hydrocarbon leaks from various sources may drain into the engine crankcase. The engine's connecting rods may whip the crankcase oil, which when mixed with hydrocarbons leads to foaming in the crankcase. The hydrocarbon foam may migrate to the engine intake system through a crankcase ventilation tube connecting the crankcase to the intake. In addition, the hydrocarbons leaks from the various sources may directly drain into the engine intake. As the hydrocarbons accumulate in the engine intake, small pools of hydrocarbons are formed. A sudden of rush of air, as experienced during tip-ins, may dislodge the hydrocarbon pool and move the hydrocarbons into the engine cylinders with some cylinders ingesting more hydrocarbons than others due to the configuration of the intake manifold. As a result of the hydrocarbon ingestion in the engine cylinder, uncontrolled combustion may occur in the combustion chambers leading to cylinder imbalance. At the same time, hydrocarbons that could not participate in the in-cylinder combustion get transported to the exhaust system where the unburned hydrocarbons get oxidized (specifically at the exhaust DOC). This leads to an uncontrolled exhaust exotherm across the DOC. Thus, by simultaneously monitoring across an exhaust DOC for an elevated exotherm and monitoring cylinder acceleration data for cylinder imbalance, hydrocarbon ingestion can be accurately diagnosed, and addressed.

In one example, the controller may confirm a set of global "core entry conditions", that is, entry conditions that must be met to enable monitoring of exhaust exotherms across a diesel oxidation catalyst and cylinder imbalance to be initiated. These entry conditions include, for example, ambient temperature being within a window, coolant temperature being higher than a threshold, vehicle speed being higher than a threshold, or a PTO status being indicated. In addition, error states for above inputs may be already indicated.

Next the controller may confirm entry conditions for exotherm detection, that is, conditions that must be met to enable monitoring of the exotherm. These include, for example, a DOC inlet temperature being higher than a threshold (wherein the threshold is a function of ambient temperature), a DPF regeneration status being not in regeneration, the exhaust DOC being adequately warm, an exhaust DOC outlet temperature being higher than a threshold, a thermally stable exhaust system (After DPF regeneration or After a quick stop-start) being indicated. In parallel, the controller may confirm entry conditions for cylinder imbalance detection. This may include confirming that the DPF is not regenerating. Pre-conditions for steady state detection may include confirming that engine speed is within a window, engine torque is within a window, and engine speed and torque are stable. Pre-conditions for transient state detection may include, for example, determining a start of detection window based on the rate of change of mass air flow and determining an end of detection window based on the mass air flow rate.

Once all the entry pre-conditions and conditions are met, in response to a cylinder imbalance and an elevated exotherm occurring in the respective windows, as defined for steady-state and transient conditions, the controller may determine that hydrocarbons are accumulating in the engine intake and/or crankcase and that mitigating steps need to be taken to reduce further accumulation.

In this way, correlations between cylinder imbalances and elevated exhaust exotherms can be used to identify hydrocarbon accumulation along an engine intake system. By using substantial signal processing and extensive algorithms to assess cylinder imbalance data collected during steady-state as well as a transient engine operating conditions, noise factors experienced due to misfires or due to hydrocarbon accumulation at alternate engine locations can be reduced and the hydrocarbon accumulation at the engine intake may be more accurately diagnosed. By reacting to the accumulation with a controlled limiting of engine speed and load, substantial engine degradation can be curbed.

As will be appreciated by one of ordinary skill in the art, routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for an engine, comprising:
in response to cylinder imbalance and an elevated engine exhaust exotherm indicative of hydrocarbon oxidation, limiting engine speed and load to reduce hydrocarbon accumulation at an engine intake.

2. The method of claim 1, further comprising flowing intake air from a throttle to a y-junction, and then from a first outlet of the y-junction to a first group of cylinders and from a second outlet of the y-junction to a second group of cylinders, a longitudinal axis of the first outlet of the y-junction aimed at a first cylinder positioned away from an end cylinder of the first group, a longitudinal axis of the second outlet of the y-junction aimed at a second cylinder positioned away from an end cylinder of the second group.

3. The method of claim 2, wherein the cylinder imbalance is based on crankshaft acceleration differences between individual engine cylinders of each of the first and second group of cylinders, the crankshaft acceleration estimated during steady-state engine conditions and transient engine conditions.

4. The method of claim 3, wherein crankshaft acceleration differences estimated during transient engine conditions include crankshaft acceleration differences estimated over a dynamically adapted window during the transient engine conditions, the dynamically adapted window adjusted based at least on mass air flow during the transient engine conditions.

5. The method of claim 3, wherein the engine exhaust includes an oxidation catalyst and a particulate filter and wherein the exhaust exotherm is based on an exhaust temperature difference across the oxidation exhaust catalyst estimated during engine steady-state conditions when the particulate filter is not being regenerated.

6. The method of claim 2, wherein limiting engine speed and load includes limiting fuel injection to all engine cylinders.

7. The method of claim 2, wherein a degree of limiting is based on whether crankshaft acceleration differences were identified during transient engine conditions or steady-state engine conditions.

8. The method of claim 2, further comprising, setting a diagnostic code and illuminating a malfunction light to indicate the hydrocarbon accumulation at the engine intake.

9. The method of claim 2, further comprising elevating an engine temperature to release the hydrocarbons accumulated at the engine intake.

* * * * *